July 16, 1963  P. L. JOHNSON  3,097,548
ADJUSTABLE BORING HEAD
Filed July 1, 1960
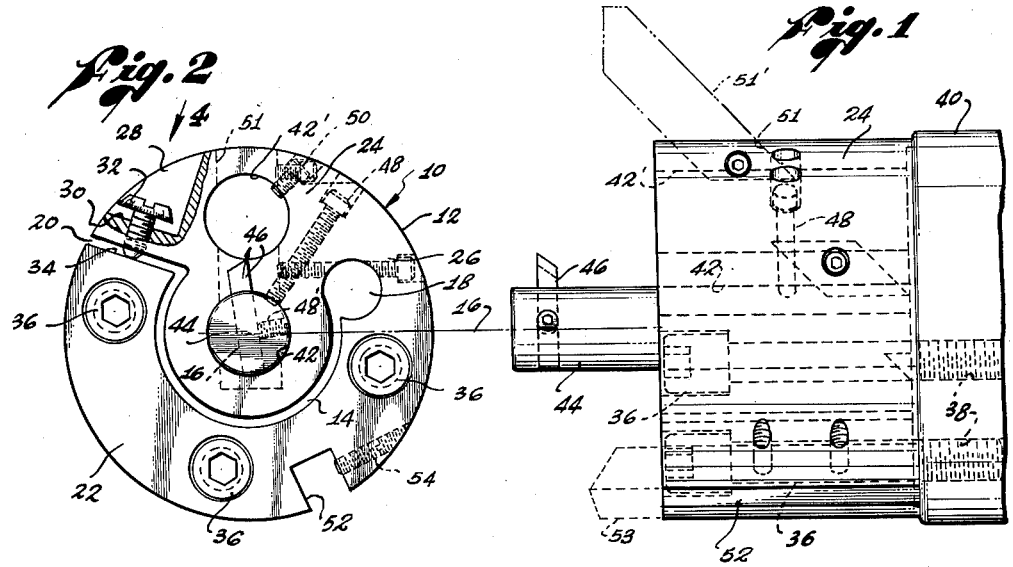
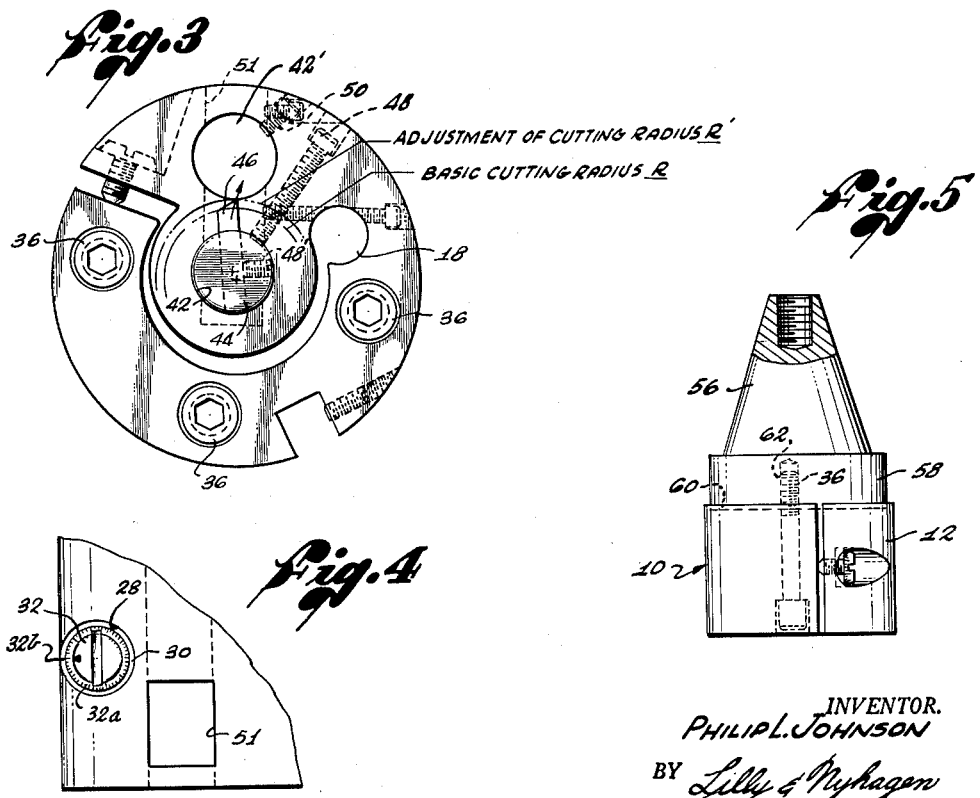
INVENTOR.
PHILIP L. JOHNSON
BY Lilly & Nyhagen
ATTORNEYS

United States Patent Office 3,097,548
Patented July 16, 1963

3,097,548
ADJUSTABLE BORING HEAD
Philip L. Johnson, 9710 Oceangate Ave., Inglewood, Calif.
Filed July 1, 1960, Ser. No. 40,212
2 Claims. (Cl. 77—58)

This invention relates generally to metal working tools and, particularly, to an improved adjustable boring head.

Generally speaking, boring operations are performed either by rotating the work while the boring tool remains stationary or by rotating the boring tool while the work remains stationary. In the former method of boring, the radius of the cut is adjusted by moving the boring tool radially of the rotational axis of the work. In the method of boring employing a rotary boring tool, the cutting bit of the tool is radially adjusted with respect to its axis of rotation to adjust the cutting radius. This invention deals with the last-mentioned method of boring and has as its general object to provide a new and improved adjustable, rotary boring head.

A more specific object of the invention is to provide a rotary boring head of the character described having a simple and inexpensive means for accommodating adjustment of the boring bit to vary its cutting radius.

A further object of the invention is to provide an adjustable, rotary boring head of the character described which is adapted for mounting on various types of metal working machines.

Yet a further object of the invention is to provide an adjustable, rotary boring head of the character described which is rugged in construction and adapted for accurate adjustment of its cutting radius from a relatively small radius to a relatively large radius.

Other objects, advantages and features of the invention will become readily apparent as the description proceeds.

A present illustrative embodiment of the invention will now be described in detail by reference to the attached drawing, in which:

FIG. 1 is a side elevational view of the present boring head mounted on a rotary milling machine spindle;

FIG. 2 is an end view, partially broken away, of the boring head in FIG. 1;

FIG. 3 is a view similar to FIG. 2 showing the boring head adjusted to its maximum cutting radius;

FIG. 4 is a view looking in the direction of arrow 4 in FIG. 2; and

FIG. 5 illustrates the present boring head mounted on a taper.

The boring head 10 illustrated in this drawing comprises a rotary tool holder 12 consisting of a cylindrical block of steel. This block has a generally semicircular slit 14 centered on the axis of rotation 16 of the boring head and opening through opposite ends of the block. One end of the slit 14 opens to a bore 18 extending through the block parallel to the axis 16. A generally radial slit or cut 20, parallel to the axis 16, extends from the other end of the slit 14 through the outer surface of the block.

The slits 14 and 20 separate the block into a portion 22, offset from the axis of rotation 16, and a portion 24, having a part thereof on the axis of rotation, which are joined by the thin section 26 between the wall of the bore 18 and the outer surface of the block. Portion 24 of the block has a recess 28 cut into its side wall. The bottom wall 30 of this recess is substantially parallel to the radial slit 20.

Threaded in the bottom wall 30 of the recess, on an axis substantially perpendicular to the radial slit 20, is an adjusting screw 32. The tip of this screw extends across the slit 20 and engages the opposing surface 34 on portion 22 of the block. When the adjusting screw 32 is rotated in a direction to urge the tip of the screw against the surface 34, the thin section 26 of metal bends and the two portions 22 and 24 of the block are forced apart. When the adjusting screw 32 is rotated in the opposite direction, the resiliency of the metal at the thin section 26 urges the two parts of the block back together.

Extending axially through portion 22 of the block are three bolts 36. These bolts extend beyond the rear face of the block and are spaced for threaded engagement in the threaded bores 38 formed in a conventional milling machine spindle 40. The bolts 36, therefore, provide a means for rigidly attaching portion 22 of the holder 12 to the spindle 40. It will be apparent that with the portion 22 thus rigidly attached to the spindle, it becomes, in effect, a relatively fixed portion and the other portion 24 of the holder becomes a relatively movable portion which can be adjusted toward and away from the fixed portion 22 by adjustment of the screw 32.

Extending axially through the portion 24 of the holder is a bore 42 for slidably receiving a boring bar 44. The bore 42 is located to be coaxial with the axis 16 of rotation of the holder in one position of radial adjustment of the portion 24.

Boring bar 44 fixedly mounts, at its outer end, a radial cutting bit 46 which extends generally in the direction, indicated by the arrow, of radial adjustment of the portion 24 of the holder. Boring bar 44 is secured in the holder by means of a lock screw 48 threaded in the block 12.

From this description, it is evident that when the portion 24 of the holder occupies its position in which the bore 42 is coaxial with the turning axis 16 of the holder, the boring tool 10 will have a cutting radius R, indicated in FIG. 3. When the adjusting screw 32 is rotated to force the movable portion 24 of the holder away from the fixed portion 22, the cutting bit 46 moves generally radially outward to increase the cutting radius to R'. Thus, the slits 14 and 20 and the adjusting screw 32 provide a simple and inexpensive means for adjusting the cutting radius of the cutting bit 46. Preferably, the head of the adjusting screw 32 is conically tapered and engraved with calibrated indicia 32a which is read against a reference mark 32b on the bottom wall 30, as indicated in FIG. 4, for indicating the cutting radius of the tool.

If desired, portion 24 of the holder may be formed with one or more additional axial bores to receive the boring bar 44, as indicated at 42'. Additional lock screw means 50 are provided for retaining the boring bar in this additional hole. By providing more than one bore for the boring bar, in this way, large adjustments of the cutting radius may be effected by selective insertion of the boring bar in one of the bores 42 or 42' and a fine adjustment of the cutting radius can then be effected by rotation of the adjustment screw 32. The cutting radius may be further increased by providing a rectangular hole 51 in the adjustable portion 24 of the holder, which is inclined at an angle, such as a 45° angle, to the axis of the holder, for receiving a standard cutting bit 51'. The end of cutter 51' is ground, as shown, so that the cutter can be used either as a fly cutter or for boring. The cutting radius of cutter 51' may, of course, be adjusted by the adjusting screw 32. Also, the peripheral wall of the holder may be axially grooved, as at 52, to receive a fly cutter 53. This fly cutter is retained on the holder by screws 54. When using the fly cutter 53, of course, the boring bar 44 is removed.

FIG. 5 illustrates an alternative means for attaching the holder 10 to a tool spindle. In this case, the attachment means comprises a standard taper 56 having, at one end, a disc 58 having a close fit in a cylindrical recess 60 in the rear face of the block 12. Disc 58 has threaded holes 62 to receive the attaching bolts 36, whereby the taper 56 can be securely fixed to the block 12. In this way, the present boring head may be used in metal working machines having provision for receipt of such a taper.

Clearly, therefore, the boring head hereinbefore described and illustrated is fully capable of attaining the several objects and advantages preliminarily set forth.

While a preferred embodiment of the invention has been disclosed for illustrative purposes, numerous modifications in the design and arrangement of parts of the invention are possible within the scope of the following claims.

What is claimed is:

1. A boring head comprising a rotary tool holder having a given axis of rotation and including a cylindrical metal block which has a generally semicircular slit parallel to and centered on said axis and an approximately radial slit parallel to said axis extending from one end of said semicircular slit through the outer surface of the block to form a first, relatively fixed holder portion and a second, flexible, relatively radially adjustable holder portion on said axis, means on said first portion to attach the latter to a rotary tool spindle for rotation of the holder on said axis, said second portion having a bore which is parallel to said axis and coaxial with the axis in one position of adjustment of the second portion, said bore being adapted to receive a boring bar, means for releasably securing a boring bar in said bore, and means for radially adjusting said second portion to radially adjust said bore with respect to said axis.

2. The subject matter of claim 1 in combination with a boring bar in said bore having a radial cutting bit extending in the direction of outward radial adjustment of said second portion.

References Cited in the file of this patent

UNITED STATES PATENTS

| | | |
|---|---|---|
| 834,457 | Culman | Oct. 30, 1906 |
| 1,382,447 | Wells | June 21, 1921 |
| 2,190,492 | Staples | Feb. 13, 1940 |
| 2,812,672 | Sainati et al. | Nov. 12, 1957 |
| 2,844,053 | Wagner | July 22, 1958 |

OTHER REFERENCES

"American Machinery," March 14, 1955, page 161 relied upon. (Copy in Scientific Library and Div. 58.)